United States Patent
Burkus, II et al.

(10) Patent No.: US 6,262,188 B1
(45) Date of Patent: Jul. 17, 2001

(54) FUNCTIONALIZED MQ RESIN AS AN ADHESION ENHANCING ADDITIVE

(75) Inventors: Frank S. Burkus, II, Troy; Slawomir Rubinsztajn, Niskayuna, both of NY (US); Jacek Gulinski, Poznan; Bogdan Marciniec, Swarzedz, both of (PL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/454,935

(22) Filed: Dec. 3, 1999

Related U.S. Application Data

(60) Provisional application No. 60/113,773, filed on Dec. 23, 1998.

(51) Int. Cl.$^7$ .................................................. C08L 83/05
(52) U.S. Cl. ........................... 525/479; 528/39; 528/15; 528/14; 528/31; 528/26; 528/27; 528/34; 156/329; 524/588
(58) Field of Search .................. 528/39, 15, 14, 528/31, 26, 27, 34; 525/479; 156/329; 524/588

(56) References Cited

U.S. PATENT DOCUMENTS

| | | |
|---|---|---|
| 3,996,195 | 12/1976 | Sato et al. |
| 4,257,936 | 3/1981 | Matsumoto et al. |
| 4,370,358 * | 1/1983 | Hayes et al. |
| 4,855,351 | 8/1989 | Stein. |
| 5,079,311 * | 1/1992 | Colas. |
| 5,310,601 * | 5/1994 | Riding. |
| 5,405,094 | 4/1995 | Poser et al. |
| 5,405,896 | 4/1995 | Fujiki et al. |

* cited by examiner

Primary Examiner—Robert Dawson
Assistant Examiner—Kuo-Liang Peng

(57) ABSTRACT

Compositions, comprising functionalized resins having the formula $$M_x^H M_y^R Q \qquad (I)$$

wherein x+y is in the range from 0.5 to 4 and the ratio x:y is in the range from 1:10 to 10:1;

Q is $SiO_{4/2}$ $M^H$ is $R^1R^2HSiO_{1/2}$ $M^R$ is $R^1R^2RSiO_{1/2}$ wherein each $R^1$ and $R^2$ is independently an alkyl, fluoroalkyl, or aryl group having from 1 to about 18 carbons, and R can be the same or different and is selected from the group consisting of the formulas (II), (III) and (IV):

$$—CH_2BOC(O)Ar \qquad (II)$$

wherein Ar is a phenyl or substituted phenyl group, B is a branched or straight-chain alkylene group having from 1 to 12 carbon atoms;

$$—CH_2CH_2Ep \qquad (III)$$

wherein Ep is an organic radical containing an epoxy functional; and $$—A^1—C(O)O—A^2—Si(OR^1)_3 \qquad (IV)$$

wherein $A^1$ a branched or straight-chain alkylene group having from 2 to 12 carbon atoms, $A^2$ is a branched or straight-chain alkylene group having from 1 to 16 carbon atoms and $R^1$ is as previously defined.

27 Claims, No Drawings

FUNCTIONALIZED MQ RESIN AS AN ADHESION ENHANCING ADDITIVE

This application claims rights of priority from U.S. Provisional Patent Application Ser. No. 60/113,773, filed Dec. 23, 1998, which is hereby incorporated by reference.

BACKGROUND OF THE INVENTION

This invention relates to addition cure silicone polymer compositions. In particular, this invention relates to addition cure silicone polymer compositions comprising a functionalized silicone riesin as an effective adhesion-enhancing additive.

Addition cure silicone adhesives are a commercially important class of adhesives. A typical addition cure composition comprises an alkenyl-group containing organopolysiloxane, an organohydrogenpolysiloxane, and a catalyst. The adhesiveness of these compositions is often improved by addition of one or more adhesion-promoting additives (adhesion promoters). Several U.S. patents, for example U.S. Pat. Nos. 3,996,195, 4,257,936, 4,855,351, 5,405,896, and 5,405,094 describe certain organofunctional silanes and oligosiloxanes usable as adhesion enhancing additives for addition cure silicone adhesives. These compounds are most often organovinyloxysilanes, or cyclic or linear organooligosiloxanes comprising various organic functionalities, such as glycidyl, carbonyl, carbonyloxy, silyloxy or alkoxysilyl groups, as well as optional Si—H functional groups. Such compounds are typically mixed with an addition cure silicone adhesive master batch in ratios in the range of 0.1–10 parts additive to 100 parts master batch. The resulting silicone adhesive can be applied to substrates such as metals, plastics or glass, and cured by exposure to heat. The cured silicon will strongly adhere to the substrates.

There are two major disadvantages of the above-described and other known adhesion promoters. The first is their substrate selectivity. Polycarbonates are an example of substrates to which adhesion is very difficult. The second disadvantage is the negative impact that adhesion promoters have on the cure rate of the adhesive, sometimes slowing cure to commercially unacceptable levels. There is thus a continued need for new adhesion-enhancing additives which will promote adhesion to a wide range of substrates, and which will allow cure at low temperature.

SUMMARY OF THE INVENTION

The above-described and other disadvantages of the prior art are alleviated by the compositions of the present invention, comprising functionalized resins having the formula $$M_x^H M_y^R Q \quad (I)$$

wherein x+y is in the range of 0.5 to 4, the ratio x:y is in the range of 1:10 to 10:1, and Q is $SiO_{4/2}$ $M^H$ is $R^1R^2HSiO_{1/2}$ $M^R$ is $R^1R^2RSiO_{1/2}$ wherein each $R^1$ and $R^2$ is independently an alkyl, fluoroalkyl, or aryl group having from 1 to about 18 carbons, and R can be the same or different and is selected from the group consisting of the formulas (II), (III) and (IV):

$$—CH_2BOC(O)Ar \quad (II)$$

wherein Ar is a phenyl or substituted phenyl group, B is a branched or straight-chain alkylene group having from 1 to 12 carbon atoms;

$$—CH_2CH_2Ep \quad (III)$$

wherein Ep is an organic radical containing an epoxy functional group selected from the group consisting of:

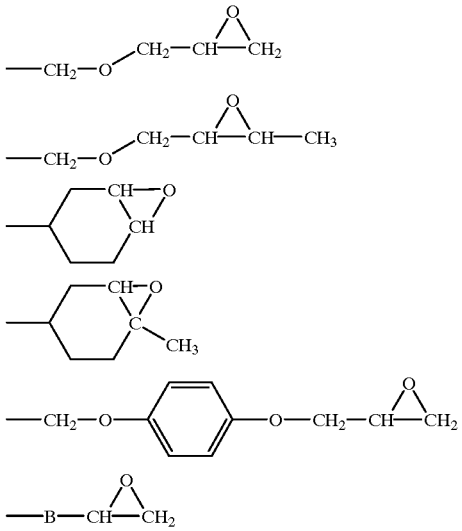

wherein B is as previously defined; and $$—A^1—C(O)O—A^2—Si(OR^1)_3 \quad (IV)$$

wherein $A^1$ is a branched or straight-chain alkylenec group having from 2 to 12 carbon atoms and $A^2$ is a branched or straight-clhain alkylene group having from 2 to 16 carbon atoms, and $R^1$ is as defined above.

In the method of the present invention, such functionalized resins are produced by reaction, in the presence of a precious metal catalyst, of an organohydrogensiloxane having the formula $$M_z^H Q \quad (V)$$

wherein z is in the range from 0.5 to 4, Q is as defined above, and $M^H$ is $R^1R^2HSiO_{1/2}$ wherein $R^1$ and $R^2$ are as defined above, with a less than stoichiometric amount of an unsaturated compound or compounds of formulas (VI), (VII), and silanes of formula (VIII) presented below:

$$H_2C=CH(CH_2)_wOC(O)Ar \quad (VI)$$

wherein Ar is a phenyl or substituted phenyl group, and w is 0 or an integer wherein $1 \leq w \leq 8$;

$$H_2C=CHEp \quad (VII)$$

wherein Ep is an organic radical containing an epoxy functional group as defined above; or

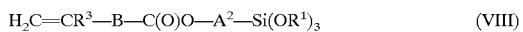 (VIII)

wherein B is absent or a branched or straight-chaini alkylene group having from 4 to 12 carbon atoms, $A^2$ and $R^1$ are as defined above and $R^3$ is hydrogen or a methyl group.

DETAILED DESCRIPTION OF THE INVENTION

The compositions of the present invention comprise functionalized silicone resins having the formula $$M_x^H M_y^R Q \qquad (I)$$

wherein x+y is in the range from 0.5 to 4 (including 0.5 and 4) and the ratio x:y is in the range from 1:10 to 10:1. Preferably, the ratio x:y ranges from 3:10 to 10:3. Formula (I) is written using the well-known nomenclature for silicones wherein Q is $SiO_{4/2}$ $M^H$ is $R^1R^2HSiO_{1/2}$ $M^R$ is $R^1R^2RSiO_{1/2}$ wherein each $R^1$ and $R^2$ is independently an alkyl, fluoroalkyl, or aryl group having from 1 to about 18 carbons, preferably monovalent hydrocarbons having from one to three carbons, and most preferably methyl groups. Thus, formula (I) may also be written as $$(R^1R^2HSiO_{1/2})_x(SiO_{4/2})(R^1R^2RSiO_{1/2})_y$$

wherein x, y, $R^1$ and $R^2$ are as defined above, and R can be the same or different and is selected from the group consisting of the formulas (II), (III) or (IV):

—$CH_2BOC(O)Ar$ (II)

wherein Ar is a phenyl or substituted phenyl group, B is a branched or straight-chain alkylene group having from 1 to 12 carbon atoms;

—$CH_2CH_2Ep$ (III)

wherein Ep is an organic radical containing an epoxy group selected from the following:

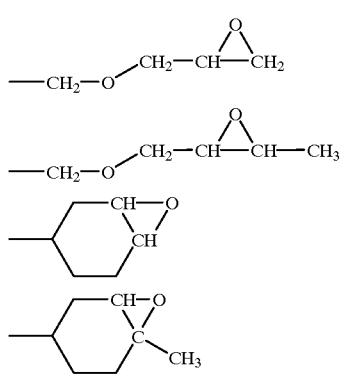

-continued

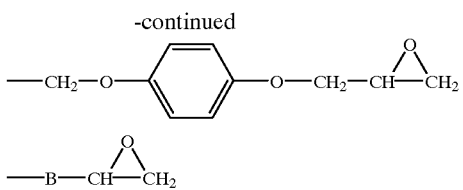

wherein B is a branched or straight-chain alkylene group having from 1 to 12 carbon atoms; and

 (IV)

wherein $A^1$ a branched or straight-chain alkylene group having from 2 to 12 carbon atoms and $A^2$ is a branched or straight-chain alkylene group having from 1 to 16 carbon atoms, and $R^1$ is as defined above. Preferably, $A^1$ is —$CH_2CH_2$— or —$CH_2CH(CH_3)$—, and $A^2$ has from 2 to 12, preferably from 2 to 6 carbon atoms.

In accordance with the present method, it has been discovered that functionalized resins (I) may be produced by the metal-catalyzed reaction of an organohydrogensiloxane having the formula $$M_z^H Q \qquad (V)$$

wherein z is in the range from 0.5 to 4 (including 0.5 and 4). Q is as defined above, and $M^H$ is $R^1R^2HSiO_{1/2}$ wherein $R^1$ and $R^2$ are as defined above. Preferably, $R^1$ and $R^2$ are methyl. Formula (V) may also be written as $$(R^1R^2HSiO_{1/2})_zSiO_{4/2}$$

wherein z, $R^1$ and $R^2$ are as defined above.

Organohydrogensiloxane (V) is reacted with a less than stoichiometric amount of an unsaturated compound or mixture of compounds of formulas (VI), (VII), and silanes of formula (VIII) below:

$H_2C=CH(CH_2)_wOC(O)Ar$ (VI)

wherein Ar is a phenyl or substituted phenyl group, and w is 0 or an integer wherein $1 \leq w \leq 8$;

$H_2C=CHEp$ (VII)

wherein Ep is an organic radical containing an epoxy functional group as defined above; or

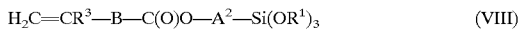 (VIII)

wherein B is absent or a branched or straight-chaini alkylene group having from 1 to 10 carbons, and $A^2$ and $R^1$ are as defined above and $R^3$ is hydrogen or a methyl group. Preferably, B is absent and R3 is hydrogen. Preferred unsaturated epoxides of formula (VII) are shown below:

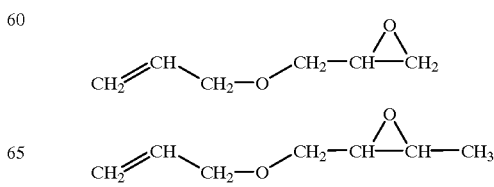

-continued

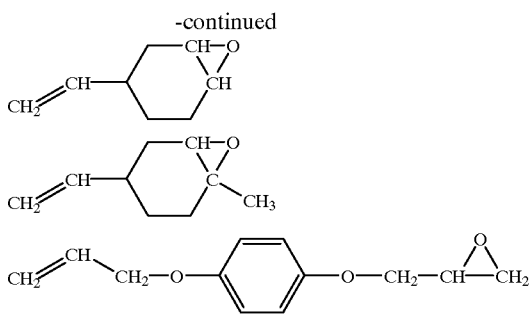

Preferred silanes (VIII) have the formula (IX)

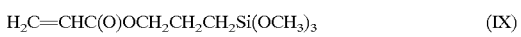

$$H_2C=CHC(O)OCH_2CH_2CH_2Si(OCH_3)_3 \qquad (IX)$$

In an important feature of the method, the molar ratio of Si—H functional groups in organohydrogensiloxane (V) to reactive alkylene groups in (VI), (VII), or (VIII) is in the range from about 10:1 to about 10:9, and preferably in the range from about 10:3 to about 10:7. Most preferably, the ratio is about 10:5 and the unsaturated compounds are methacryloxypropyltrimethoxysilane and allylgilyclidylether.

Effective catalysts for the reaction of (V) with (VI), (VII), or (VIII) are precious metals and complexes of precious metals such as platinum, rhodium, ruthenium, and palladium, osmium, and iridium. Exemplary are platinum black, chloroplatinic acid, alcohol modified chloroplatinic acid, complexes of chloroplatinic acid with olefins, aldehydes, vinylsiloxanes or acetylene alcohols, and rhodium complexes. A preferred catalyst is a Karstedt catalyst.

Unexpectedly, it was discovered that the compounds of the present invention are highly effective adhesion-enhancing additives for silicone adhesives. As shown below, addition of the compound to the addition cure master batch results in a silicone adhesive which strongly adheres to polycarbonate.

Silicone adhesive compositions suitable for use with the additive of the present invention are well known in the art. Especially preferable compositions are the so-called "two part cure" compositions, comprising, in one part, a silicone base polymer and a catalyst, and in the second part, the silicone base polymer and a cross-linking agent. Cure is initiated upon mixing of the two parts.

In addition to the adhesive agent, the adhesive silicone rubber composition of the invention generally includes (a) an alkenyl group-containing organopolysiloxane, (b) an organohydrogenpolysiloxane, and (c) an addition reaction catalyst.

Component (a) is an organopolysiloxane containing an alkenyl group which may be selected from well-known organopolysiloxanes conventionally used as a major component of addition reaction curing type silicone rubber compositions, typically having a viscosity of about 100 to 100,000 centipoise at room temperature.

Preferred organopolysiloxanes are represented by the general formula: $R^4_aSiO_{(4-a)/2}$ wherein $R^4$ is a substituted or unsubstituted monovalent hydrocarbon group, preferably having 1 to 30 carbon atoms. Examples of the hydrocarbon group represented by $R^4$ include alkyl groups such as methyl, ethyl and propyl; alkenyl groups such as vinyl, propenyl and butenyl; aryl groups such as phenyl and xylyl; and halo- or cyano-substituted hydrocarbon groups such as 3,3,3-trifluoropropyl. The monovalent hydrocarbon groups may be identical or different as long as an alkenyl group is contained in the organopolysiloxane molecule. The content of alkenyl group is preferably 0.01 to 10 mol %, more preferably 0.1 to 1 mol %, of the entire R groups. Letter a is a number of from 1.9 to 2.4. The organopolysiloxane may be a linear one or a branched one further containing a $R^4SiO_{3/2}$ unit or $SiO_{4/2}$ unit. The substituent on the silicon atom is basically any of the above-mentioned groups. It is desirable to introduce a vinyl group among the alkenyl groups and a methyl or phenyl group among other substituent groups.

Illustrative, non-limiting examples of the org, anopolysiloxane are found in the above-referenced U.S. Pat. Nos. 5,405,094; 5,405,896; 4,855,351; 4,257,936; and 3,996,195, all of which are incorporated herein in their entirety. The organopolysiloxanes may be prepared by per se known methods. For example, they are obtained by effecting an equilibration reaction between an organocyclopolysiloxane and a hexaorganodisiloxane in the presence of an alkali or acid catalyst.

Component (b) is an organohydrogenpolysiloxane which is used as a curing (crosslinking) agent in conventional addition reaction curing type silicone rubber compositions. The organohydrogenipolysiloxane (b) serves as a cross-linking agent by reacting with component (a). It is not particularly limited in molecular structure and may be any of conventionally used organohydrogenpolysiloxanes of linear, cyclic and branched structures. However, it should have at least two hydrogen atoms each directly attached to a silicon atom in a molecule. The substituent or substituents attached to a silicon atom other than hydrogen are the same as the substituents described for organopolysiloxane (a). Suitable cross-linking, agents include low molecular weight silicone polymers having SiH functional groups for crosslinking with the base silicone polymer. Component (b) is preferably added in an amount to provide 0.4 to 5 equivalents, especially 0.8 to 2 equivalents per alkenyl group in component (a).

The organohydrogenpolysiloxanes may be prepared by per se known methods. For example, the most commonly used method is by equilibrating octamethylcyclotetrasiloxane and/or tetramethycyclotetrasiloxane and a compound containing a hexamethyldisiloxane or 1,1-dihydro-2,2,3,3-tetramethyldisiloxane unit, which will become a terminal group in the presence of a catalyst such as sulfuric acid, trifluoromethanesulfonic acid or methanesulfonic acid, at a temperature between −10° C. and +100° C.

Component (c) is an addition reactive catalyst which is generally selected from platinum, platinum compounds, rhodium and rhodium compounds. Since the catalyst is used by promoting curing addition reaction or hydrosilation between components (a) and (b), it may be a conventional known one. Exemplary are platinum black, chloroplatinic acid, alcohol modified chloroplatinic acid, complexes of chloroplatinic acid with olefins, aldehydes, vinylsiloxanes or acetylene alcohols, and rhodium complexes. The amount of the catalyst added is suitably determined in accordance with a desired curing rate, although it is generally in the range of 0.1 to 1000 ppm, preferably 1 to 200 ppm, more preferably 1 to 20 ppm, of platinum or rhodium based on the total of the entire components.

In one preferred embodiment where the silicone rubber should have physical strength, the silicone rubber composition further includes finely divided silica having a specific surface area of at least 50 m$^2$/g in an amount of 0 to 100 parts, preferably 5 to 50 parts, more preferably 10 to 40 parts by weight per 100 parts by weight of the total of components (a) and (b). Exemplary of hydrophilic silica are the AERO-SILs 130, 200 and 300 (commercially available from Degussa) and CABOSIL MS-5 and MS-7 (commercially available from Cabot Corp.).

In some cases, the curing time of the silicon rubber composition is adjusted in order to be effective in practice, using a suitable control agent. Such cure-adjusting agents may be selected from vinyl-containing organopolysiloxanes such as vinylcylotetrasiloxane, triallylisocyanurate, alkyl maleates, acetylene alcohols and silane or siloxane modified derivatives thereof, hydroperoxides, tetramethylethylenediamine, benzotriazole and mixtures thereof. Also useful are platinum group compounds combined with organic resins and silicone resins.

Suitable additives may also be blended into the silicone rubber composition. Such additives include non-reinforcing fillers such as ground quartz, diatomaceous earth, and calcium carbonate; coloring agents including inorganic pigments such as Cobalt Blue; organic dyes; and agents for improving heat resistance and flame retardance such as cerium oxide, zinc carbonate, manganese carbonate, iron oxide, titanium oxide, and carbon black.

The adhesive compositions comprising the additive described herein are advantageously used to join with organic resins, especially thermoplastic resins to form one-piece articles. Examples of the thermoplastic resin to which the composition can be joined include polypropylene, polyethylene, ABS resins, nylon, polycarbonate, polyphenylene oxide, polybutylene terephthalate, polyphenylene sulfide, polyethylene terephthalate, acrylic resins, polyacetal resins, and other engineering plastics such as polyarylates, polysulfones, polyether sulfones, polyether imides, polyether ketones, polyimides, and liquid crystal polymers.

The thermoplastic resin to which the silicone rubber composition is to be joined may take various shapes in common solid state, although resin materials loaded with glass fiber reinforcements, silica reinforcements and other inorganic reinforcements are advantageous to form a more reliable adhesion. The glass fibers may be those commonly used in resin reinforcement. The silica reinforcements include crystalline and amorphous silica powders. Other inorganic reinforcements include metal fibers such as brass fibers, nickel fibers, stainless steel fibers, and aluminum fibers as well as mica, talc, clay kaolin, aluminum hydroxide, silicon carbide whiskers, calcium sulfate, and calcium carbonate.

The following Examples are provided by way of example only, and should not be read to limit the scope of the invention.

EXAMPLE 1

Synthesis of $M_x{}^H M_y{}^R Q$ (I) wherein R is —CHC(CH$_3$)C(O)O—CH$_2$CH$_2$Si(OCH$_3$)$_3$ An organohydrogensiloxane (V) having the formula [(CH$_3$)$_2$HSiO]$_4$Si(M$^H{}_4$Q), 3-methacryloxypropyltrimethoxysilane and o-hydroxyanisol (radical inhibitor) in the molar ratios indicated in Table 1 were placed in a reaction vessel equipped with a thermometer, condenser and magnetic stirrer, and 10 ppm of a Karstedt platinum catalyst was added. The reaction mixture was heated for 2 hours at 110° C. The unreacted silane was then removed under reduced pressure (15 mm Hg) for 30 min at 110° C. Infared (IR) analysis of the product indicates that conversion of Si—H corresponds closely to the amount of added methacryloxysilane.

TABLE 1

| Run No. | Molar Ratio of SiH: C=C | % Conversion of SiH |
|---|---|---|
| 1 | 1:1 | 95 |
| 2 | 1:0.7 | 76 |
| 3 | 1:0.5 | 52 |
| 4 | 1:0.3 | 25 |

EXAMPLE 2

Synthesis of $M_x{}^H M_y{}^{R'M} R_z{}^{R''} Q$ (I) wherein R' is —CHC(CH$_3$)C(O)O—CH$_2$CH$_2$CH$_2$Si(OCH$_3$)$_3$, and R" is (CH$_2$)$_3$OCH$_2$CHCH$_2$O and a mole ratio y:z is 1:1

An organohydrogensiloxane (V) having the formula $M^H{}_2Q$, allylglycidylether, 3-methacryloxypropyltrimethoxysilane, and o-hydroxyanisol (radical inhibitor) in the following amounts respectively 4.0 g; 1.15g (10$^{-2}$ mol.); 2.5 g (10$^{-2}$ mol.); 0.04 g, were placed in a reaction vessel equipped with a thermometer, condenser and magnetic stirrer, and 10 ppm of a Karstedt platinum catalyst was added. The reaction mixture was heated for 2 hours at 110° C. The unreacted compounds were then removed under reduced pressure (15 mm Hg) for 30 min at 110° C. infrared (IR) analysis of the product indicates that conversion of Si—H corresponds closely to the amount of added unsaturated species.

Preparation of Silicone Adhesive.

The adhesion promoters of Examples 1 and 2 were tested in a liquid injection molded (LIM) silicone elastomer system suitable for use with adhesion-promoting additives. The LIM silicon elastomer system of choice was the 50-Shore A durometer LIM 9000 base. A typical base formulation for this adhesive is shown in Table 2 below:

TABLE 2

| Component | Parts (by weight) |
|---|---|
| Dimethylvinyl terminated polydimethylsiloxane, 40M cPs* | 65.0 |
| 200 m$^2$/g treated fumed silica | 26.5 |
| Dimethylvinyl terminated, methyl vinyl, dimethyl siloxane copolymer, 500 cPs | 4.0 |
| Dimethyl vinyl and trimethylsilyl chain terminated polymer, 500 cPs | 4.0 |

*centipoise

As is known, silicone adhesives are typically provided as two-part addition cure compositions having a part A and a part B. A typical part A and part B composition using the above base formulation as a foundation is described below in Table 3:

TABLE 3

| Component | Part A (Parts by weight) | Part B (Parts by weight) |
|---|---|---|
| Base (Table 2) | 100 | 100 |
| Catalyst | 0.005–0.040 | — |
| Adhesion-enhancing additive (I) | 0.5–2.0 | |
| bis-(trimethoxysilylpropyl)fumarate | — | 0.1–5 |
| Acetylenic alcohol | — | 0.20 |
| Hydride crosslinker | — | 2.5–4.5 |

Adhesion Testing

Various properties of silicone adhesives were determined using the above standard LIM 9050 formulation comprising 0.5 to 1.0% by weight adhesion promoters of the present invention. The adhesive silicone was tested for bond strength using a lap shear adhesion test. Two pieces of a substrate were overlapped in a 0.5 inch×0.5 inch (1.27 cm×1.27 cm) region with a ⅛ inch (0.32 cm) thick portion of silicone bonding the two pieces together. The samples were cured in an air circulating oven at 150° C. for one hour, and then allowed to cool to room temperature for 2 to 24 hours. After cooling, the samples were pulled to failure on a Monsanto tensometer at a head speed of 0.5 inches (1.27 cm) per minute. The bond strength and mode of failure (Cohesive, Adhesive, or Partial) are shown in Table 4 below.

TABLE 4

| | Ratio of SiH to Unsaturated Compounds in Example 1 | | |
|---|---|---|---|
| Property | 1:0.5 (Run 3) | 1:0.3 (Run 4) | 1:0.7 (Run 2) |
| Cured Properties 177° C. (350° F.) 15 minutes | | | |
| Shore A Hardness | 52.3 | 52.8 | 53.3 |
| Tensile Strength, psi | 1252 | 1192 | 1200 |
| Elongation, % | 476 | 424 | 430 |
| Tear B, ppi | 193 | 205 | 220 |
| Specific Gravity | 1.12 | 1.12 | 1.12 |
| Cure Properties MDR2000, 177° C. (350° F.) | | | |
| $T_{02}$ Scorch, seconds | 6.0 | 5.0 | 8.0 |
| $T_{90}$ Cure, seconds | 35 | 36 | 49 |
| Max. Torque, inch-pound | 17.01 | 17.12 | 16.86 |
| Peak Rate, inch-pound/min. | 100.3 | 99.9 | 89.3 |
| Substrate | Adhesion, psi (type of failure) | | |
| Valox[1] 420 | >250 (C) | >250 (C) | >250 (C) |
| Adhesion Lexan[2] 141 | 450 (C) | 500 (C) | 445 (C) |
| Noryl[3] GET 830 | 340 (C) | 360 (PA) | 350 (C) |
| PolyAmide | 414 (C) | 384 (C) | 410 (C) |

[1]Polybutylphthalate commercially available from GE Plastics
[2]Polycarbonate commercially available from GE Plastics
[3]Polyphenyloxide commercially available from GE Plastics
C = Cohesive Failure
PA = Partial Adhesive Failure The mixed substituent systems detailed in Example 2 also showed excellent adhesive qualities, as illustrated in Table 5 below.

TABLE 5

| Adhesion Data Using Compounds From Example 2 | | |
|---|---|---|
| Substrate | Adhesion Value (psi) | Failure Mode |
| Valox[1] 420 | 530 | Cohesive |
| Lexan[2] 141 | 350 | Cohesive |
| Noryl[3] GTX 830 | 310 | Cohesive |
| PolyAmide | 425 | Cohesive |

[1]Polybutylphthalate commercially available from GE Plastics
[2]Polycarbonate commercially available from GE Plastics
[3]Polyphenyloxide commercially available from GE Plastics While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An adhesion-promoting additive for a silicone adhesive polymer composition, comprising functionalized silicone resins having the formula $$M_x^H M_y^R Q \qquad (I)$$

wherein x+y is in the range from 0.5 to 4 and the ratio of x:y is in the range from 1:10 to 10:1;

$Q$ is $SiO_{4/2}$ $M^H$ is $R^1R^2HSiO_{1/2}$ $M^R$ is $R^1R^2RSiO_{1/2}$ wherein each $R^1$ and $R^2$ are independently selected from the group consisting of alkyl, fluoroalkyl, and aryl groups having from 1 to about 18 carbons, and each R is the same or different selected from the group consisting of the formulas (II), (III) and (IV)

$$—CH_2BOC(O)Ar \qquad (II)$$

wherein Ar is a phenyl or substituted phenyl group, B is a branched or straight chain alkylene group having from 1 to 12 carbon atoms;

$$—CH_2CH_2Ep \qquad (III)$$

wherein Ep is an organic radical containing an epoxy group selected from the following:

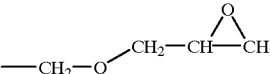
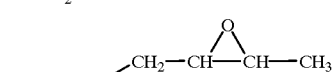
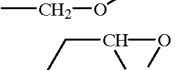
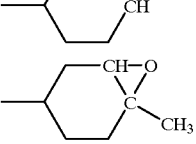

-continued

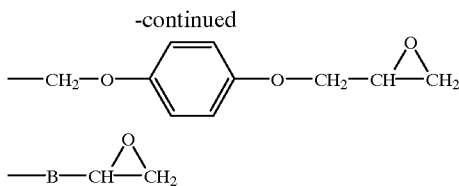

wherein B is as defined above; and

 (IV)

wherein $A^1$ a branched or straight-chain alkylene group having from 2 to 12 carbon atoms and $A^2$ is a branched or straight-chaiin alkylene group having from 1 to 16 carbon atoms, and $R^1$ is as defined above.

2. The additive of claim 1, wherein $R^1$ and $R^2$ are independently monovalent hydrocarbons having from one to three carbons.

3. The additive of claim 2, wherein $R^1$ and $R^2$ are methyl groups.

4. The additive of claim 1, wherein the ratio x:y is 10:5.

5. The additive of claim 1, wherein R is —$CH_2CH_2Ep$, —$A^1$—$C(O)O$—$A^2$—$Si(OR^1)_3$, or both, wherein Ep is an organic radical containing an epoxy group, $A^1$ is a branched or straight-chain alkylene group having from 2 to 12 carbon atoms and $A^2$ is a branched or straight-chain alkylene group having from 1 to 16 carbon atoms.

6. The additive of claim 5, wherein R is

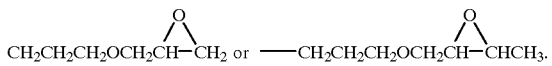

7. The additive of claim 5, wherein R is —$A^1$—$C(O)O$—$A^2$—$Si(OR^1)_3$, $A^1$ is —$CH_2CH_2$— or —$CH_2CH(CH_3)$—, and $A^2$ has from 2 to 6 carbon atoms.

8. The additive of claim 1, wherein R is a mixture of —$CH_2CH_2CH_2OCH_2CHOCH_2$ and —$CH_2CHC(O)O$—$CH_2CH_2CH_2Si(OCH_3)_3$.

9. An adhesion-promoting additive for a silicone adhesive polymer composition, comprising functionalized silicone resins having the formula

wherein x+y is in the range from 0.5 to 4 and the ratio of x:y is in the range of from 1:10 to 10:1;

Q is $SiO_{4/2}$ $M^H$ is $R^1R^2HSiO_{1/2}$ $M^R$ is $R^1R^2RSiO_{1/2}$ wherein $R^1$ and $R^2$ are methyl groups, and R is

 (IV)

wherein $A^1$ is —$CH_2CH_2$— or —$CH_2CH(CH_3)$—, and $A^2$ has from 2 to 6 carbon atoms.

10. The additive of claim 9, wherein R is —$CH_2CH_2C(O)O$—$CH_2CH_2CH_2Si(OCH_3)_3$.

11. A method of forming an adhesion-promoting additive for a silicone adhesive polymer composition, comprising the metal-catalyzed reaction of an organohydrogensiloxane having the formula

 (V)

wherein z is in the range from 0.5 to 4,

Q is $SiO_{4/2}$ $M^H$ is $R^1R^2HSiO_{1/2}$ wherein each $R^1$ and $R^2$ is independently selected from the group consisting of alkyl, fluoroalkyl, and aryl groups having from 1 to about 18 carbons, reacted with a less than stoichiometric amount of a compound or mixture of compounds selected from the group consisting of formulas (VI), (VII), and (VIII)

$H_2C$=$CH(CH_2)_wC(O)Ar$ (VI)

wherein Ar is a phenyl or substituted phenyl group, and w is 0 or an integer wherein $1 \leq w \leq 8$;

$H_2C$=CHEp (VII)

wherein $H_2C$=CHEp a compound containing an epoxy group selected from the group consisting of:

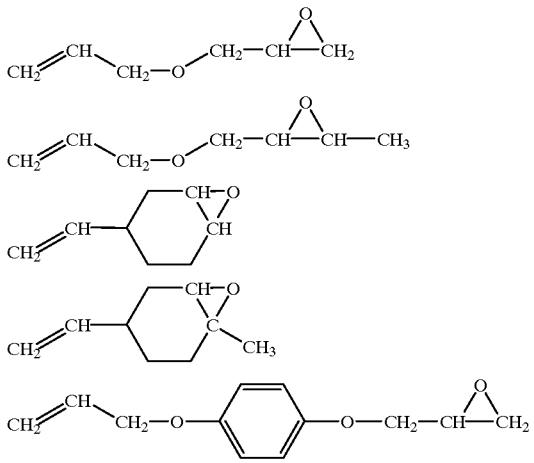

;and $H_2C$=$CR^3$—B—$C(O)O$—$A^2$—$Si(OR^1)_3$ (VIII)

wherein B is absent or a branched or straight-chaini alkylene group having from 1 to 10 carbons, $R^1$ is as previously defined, $R^3$ is hydrogen or methyl and $A^2$ is a branched or straight-chain alkylene group having from 1 to 16 carbon atoms.

12. The method of claim 11, wherein $R^1$ and $R^2$ are independently monovalent hydrocarbons having from one to three carbons.

13. The method of claim 12, wherein $R^1$ and $R^2$ are methyl groups.

14. The method of claim 11, wherein said compound or compounds is/are $CH_2$=CHEp, $H_2C$=$CR^3$—B—$C(O)O$—$A^2$—$Si(OR^1)_3$, or both, wherein Ep is an organic radical containing an epoxy group, B is absent or a branched or straight-chain alkylene group having from 2 to 10 carbons, $R^3$ is hydrogen or methyl, and $A^2$ is a branched or straight-chain alkylene group having from 1 to 16 carbon atoms.

15. The method of claim 14, wherein said compound is 1-propylglycidylether, B is absent and $R^3$ is hydrogen or methyl.

16. The method of claim 14, wherein B is absent, $R^3$ is hydrogen, and $A^2$ is propyl.

17. The method of claim 11, wherein the molar ratio of Si—H functional groups in organohydrogensiloxane (V) to reactive alkene groups in (VI), (VII), or (VIII) is in the range from about 10:1 to about 10:9.

18. The method of claim 17, wherein the ratio is in the range from about 10:3 to about 10:7.

19. The method of claim 18, wherein the ratio is about 10:5.

20. A method of forming an adhesion-promoting additive for a silicone adhesive polymer composition, comprising metal-catalyzed reaction of an organohydrogensiloxane having the formula $$M_z^H Q \qquad (V)$$

wherein z is in the range of from 0.5 to 4,

Q is $SiO_{4/2}$ $M^H$ is $R^1R^2HSiO_{1/2}$ wherein $R^1$ and $R^2$ are methyl groups, with a less than stoichiometric amount of $$H_2C = CR^3C(O)O - A^2 - Si(OR^1)_3 \qquad (VIII)$$

wherein $R^3$ is hydrogen or methyl, and $A^2$ is a branched or straight-chain alkylene group having from 1 to 16 carbon atoms, and further wherein the molar ratio of Si—H functional groups in (V) to reactive alkylene groups in (VIII) is in the range from about 10:1 to about 10:9.

21. The method of claim 20, wherein $A^2$ is propyl.

22. The method of claim 20, wherein the molar ratio of Si—H functional groups in (V) to reactive alkylene groups in (VIII) is in the range from about 10:3 to about 10:7.

23. The method of claim 22, wherein the molar ratio of Si—H functional groups is about 10:5.

24. An addition-cure silicone adhesive composition comprising the additive of claim 1.

25. An addition-cure silicone adhesive composition comprising the additive of claim 9.

26. An addition-cure silicone adhesive composition comprising an additive made by the method of claim 11.

27. An addition-cure silicone adhesive composition comprising the additive made by the method of claim 20.

* * * * *